(12) United States Patent
Satzky et al.

(10) Patent No.: US 7,920,248 B2
(45) Date of Patent: Apr. 5, 2011

(54) METHOD AND APPARATUS FOR OPTOELECTRONIC CONTACTLESS RANGE FINDING USING THE TRANSIT TIME PRINCIPLE

(75) Inventors: Uwe Satzky, Hamburg (DE); Ernst Tabel, Hamburg (DE)

(73) Assignee: PEPPERL + FUCHS GmbH, Mannheim (DE)

( * ) Notice: Subject to any disclaimer, the term of this patent is extended or adjusted under 35 U.S.C. 154(b) by 308 days.

(21) Appl. No.: 12/306,979

(22) PCT Filed: Jul. 4, 2007

(86) PCT No.: PCT/EP2007/005926
§ 371 (c)(1),
(2), (4) Date: Dec. 30, 2008

(87) PCT Pub. No.: WO2008/003482
PCT Pub. Date: Jan. 10, 2008

(65) Prior Publication Data
US 2009/0195770 A1   Aug. 6, 2009

(30) Foreign Application Priority Data
Jul. 4, 2006   (EP) ..................................... 06013854

(51) Int. Cl.
*G01C 3/08* (2006.01)
(52) U.S. Cl. ............... 356/5.01; 356/3.01; 356/4.01; 356/5.1
(58) Field of Classification Search ......... 356/3.01–3.15, 356/4.01–4.1, 5.01–5.15, 6–22, 28, 28.5
See application file for complete search history.

(56) References Cited

U.S. PATENT DOCUMENTS
4,303,983 A   12/1981   Chaborski
(Continued)

FOREIGN PATENT DOCUMENTS
| CH | 631860 A3 | 9/1982 |
| CH | 641308 A3 | 2/1984 |
| DE | 19703633 A1 | 8/1998 |
| DE | 19704340 A1 | 8/1998 |

(Continued)

OTHER PUBLICATIONS

PCT, "International Preliminary Report on Patentability", International Application No. PCT/EP2007/005926, International Filing Date Jul. 4, 2007.

*Primary Examiner* — Thomas H Tarcza
*Assistant Examiner* — Luke D Ratcliffe
(74) *Attorney, Agent, or Firm* — John A. Merecki; Hoffman Warnick LLC

(57) ABSTRACT

The invention relates to a method for optoelectronic contactless distance or range measurement or finding according to the transit time principle, in which a distance of an object from a sensor unit is determined from a time difference between a starting signal and an echo signal, which is derived from an optical measurement pulse reflected by the object and where for determining the time difference the following steps are performed: a) by comparing the starting signal and echo signal with a digital clock a digital raw value is obtained, b) with the aid of at least two fine interpolators an initial time difference between the starting signal and the beginning of the digital raw value as well as a final time difference between the echo signal and the end of the digital raw value is determined, c) to the fine interpolators are in each case supplied analog signals corresponding to the initial time difference or final time difference, respectively, and converted into a digital initial time difference or digital final time difference, respectively. The method is characterized in that for the automatic calibration of the fine interpolators a plurality of measurements according to steps a) to c) are carried out and, assuming an equal distribution for the probability with which the values in a given value interval for the initial time difference and final time difference are measured, corrections for nonlinearities and/or drifts of the characteristics of the fine interpolators are calculated. The invention also relates to an apparatus for optoelectronic contactless distance or range measurement according to the transit time principle.

20 Claims, 8 Drawing Sheets

U.S. PATENT DOCUMENTS

Figure 1:
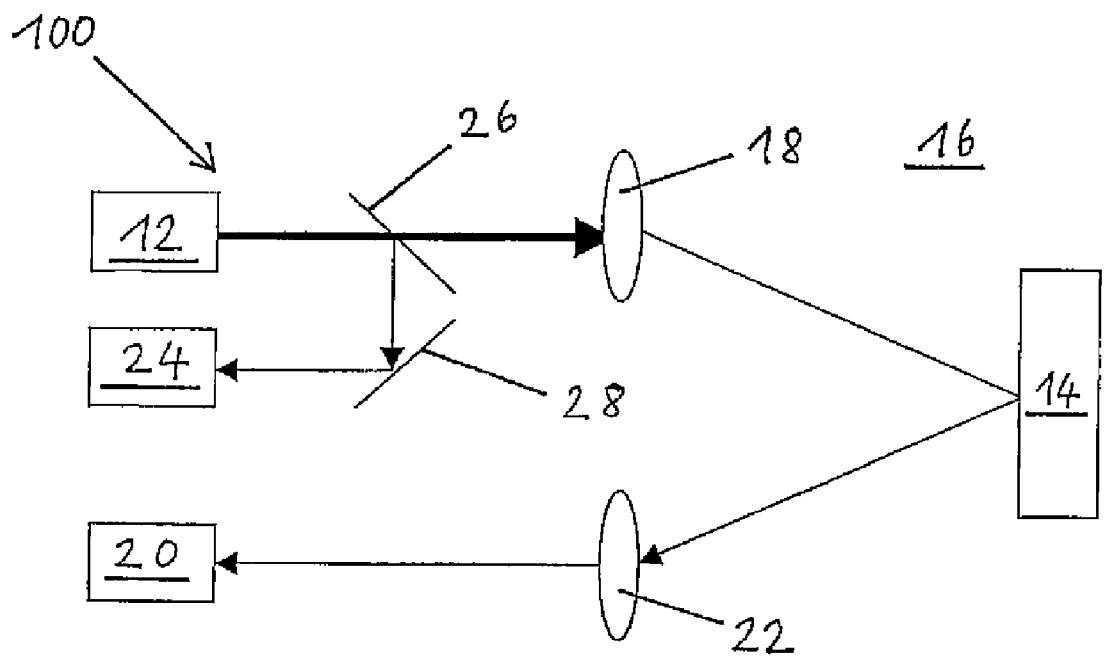

| | | |
|---|---|---|
| 4,620,788 A | 11/1986 | Giger |
| 5,179,286 A | 1/1993 | Akasu |
| 6,088,085 A | 7/2000 | Wetteborn |
| 2005/0119846 A1 * | 6/2005 | Mori .............................. 702/89 |

FOREIGN PATENT DOCUMENTS

| | | |
|---|---|---|
| DE | 19830684 C1 | 3/2000 |
| WO | WO 2008/003482 A1 | 1/2008 |

* cited by examiner

| FI | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| H | 0 | 0 | 0 | 0 | 0 | 0 | 0 | 0 | 0 | 0 | 88 | 88 | 0 | 0 | 88 | 82 |
| S | 0 | 0 | 0 | 0 | 0 | 0 | 0 | 0 | 0 | 0 | 88 | 176 | 176 | 176 | 264 | 346 |
| R | 0 | 0 | 0 | 0 | 0 | 0 | 0 | 0 | 0 | 0 | 38 | 26 | 26 | 26 | 14 | 46 |
| FI' | 0 | 0 | 0 | 0 | 0 | 0 | 0 | 0 | 0 | 0 | 1 | 3 | 3 | 3 | 5 | 6 |

| FI | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| H | 0 | 0 | 0 | 60 | 0 | 0 | 0 | 200 | 210 | 240 | 140 | 40 | 60 | 60 | 60 | 60 |
| S | 346 | 346 | 346 | 406 | 406 | 406 | 406 | 606 | 816 | 1056 | 1196 | 1236 | 1296 | 1356 | 1416 | 1476 |
| R | 46 | 46 | 46 | 6 | 6 | 6 | 6 | 6 | 16 | 6 | 46 | 36 | 46 | 6 | 16 | 26 |
| FI' | 6 | 6 | 6 | 8 | 8 | 8 | 8 | 12 | 16 | 21 | 23 | 24 | 25 | 27 | 28 | 29 |

| FI | 33 | 34 | 35 | 36 | 37 | 38 | 39 | 40 | 41 | 42 | 43 | 44 | 45 | 46 | 47 | 48 |
|---|---|---|---|---|---|---|---|---|---|---|---|---|---|---|---|---|
| H | 24 | 60 | 120 | 120 | 120 | 60 | 60 | 60 | 60 | 60 | 50 | 50 | 50 | 40 | 140 | 140 |
| S | 1500 | 1560 | 1680 | 1800 | 1920 | 1980 | 2040 | 2100 | 2160 | 2220 | 22 | 70 | 2320 | 2370 | 2410 | 2550 |
| R | 0 | 10 | 30 | 0 | 20 | 30 | 40 | 0 | 10 | 20 | 20 | 20 | 20 | 10 | 0 | 40 |
| FI' | 30 | 31 | 33 | 36 | 38 | 39 | 40 | 42 | 43 | 44 | 45 | 46 | 47 | 48 | 51 | 53 |

| FI | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|
| H | 130 | 60 | 60 | 60 | 0 | 0 | 0 | 0 | 0 | 0 | 0 | 0 | 0 | 0 | 0 | 0 |
| S | 2690 | 2820 | 2880 | 2940 | 3000 | 3000 | 3000 | 3000 | 3000 | 3000 | 3000 | 3000 | 3000 | 3000 | 3000 | 3000 |
| R | 20 | 30 | 40 | 0 | 0 | 0 | 0 | 0 | 0 | 0 | 0 | 0 | 0 | 0 | 0 | 0 |
| FI' | 56 | 57 | 58 | 60 | 60 | 60 | 60 | 60 | 60 | 60 | 60 | 60 | 60 | 60 | 60 | 60 |

Fig. 9

METHOD AND APPARATUS FOR OPTOELECTRONIC CONTACTLESS RANGE FINDING USING THE TRANSIT TIME PRINCIPLE

In a first aspect the present invention relates to a method for optoelectronic contactless range finding using the transit time principle according to the preamble of claim 1.

In a second aspect the invention is directed at an apparatus for optoelectronic contactless range finding using the transit time principle according to the preamble of claim 13.

As a function of the method used, optoelectronic sensors for contactless range finding are subdivided into different categories.

A first possibility for very precisely measuring ranges or distances involves measuring the phase position of emitted and received waves. In this method sine waves are emitted by a laser diode. By comparing the phase position of the emitted wave with the phase position of the received wave it is possible to determine the range.

Differing therefrom, in the pulse transit time method short pulses are emitted by a light source. By measuring the transmit time between pulse emission and the detection of the reflected light it is possible to determine the range of the reflecting object. The present invention relates to this method.

In such a method a distance of an object from a sensor unit is determined from a time difference between a starting signal and an echo signal, which is derived from an optical measurement pulse reflected by the object. For determining the time difference the following steps are performed: a) by comparing the starting signal and echo signal with a digital clock a digital raw value is obtained; b) with the aid of at least two fine interpolators an initial time difference between the starting signal and the beginning of the digital raw value and a final time difference between the echo signal and the end of the digital raw value are determined; c) the fine interpolators are in each case supplied with analog signals corresponding to the initial time difference or final time difference, respectively, and converted to a digital initial time difference or digital final time difference, respectively.

Such an apparatus has a sensor unit with at least one light source for emitting light pulses and a detector for detecting light pulses, a distance of an object from the sensor unit being determinable from a time difference between a starting signal and an echo signal, which is derived from an optical measurement pulse reflected by the object. Such an apparatus also has a time measuring unit for determining the time difference which has the following components: a digital clock for determining a digital raw value from the starting signal and echo signal, at least two fine interpolators for determining an initial time difference between the starting signal and the beginning of the digital raw value and a final time difference between the echo signal and the end of the digital raw value by converting analog signals corresponding to the initial time difference or final time difference, respectively, to a digital initial time difference or digital final time difference, respectively.

Methods and apparatuses of this type are e.g. used in storage and conveying technology for positioning stacker cranes, but also have numerous other uses in the industrial automation field.

A method and an apparatus for the presently used high resolution time measurement are described in CH 631 860 G.

A general problem when using fine interpolators is that the components necessary for converting the analog signals into digital values fundamentally always have nonlinearities and are also subject to drifts, e.g. temperature and ageing drifts. These mechanisms have a direct effect on the measuring accuracy obtained in the final result. The higher the precision requirement with respect to such components, the higher are generally the costs for the components.

DE 198 30 684 C1 describes an optoelectronic apparatus, in which a starting pulse for a time measurement is optically coupled out of a light source. The pulses detected there in a photodetector are alternately used both for starting and finishing the time measurement, so that imprecisions arise due to elementary electronic reasons. No reference measurement is performed therein for the purpose of calculating out drifts.

US 2005/0119846 A1 describes a method for calibrating measuring apparatuses, in which in separate calibration modes calibration curves of the analog-digital converter used are determined. The prior art used as a basis is that calibration signals are randomly generated for calibration purposes. However, this is looked upon as disadvantageous, because a comparatively long time period is required for this.

Another range finder, in which a starting pulse for a time measurement is optically coupled from a light source and supplied to a time measuring device is disclosed in DE 197 04 340 A1. The pulses detected by a photodetector are alternately used for starting and ending a time measurement.

DE 197 03 633 A1 describes a method in which, during an initial and final time interval of an overall time difference to be determined in each case charging occurs of a precision capacitor. Prior to putting the apparatus into operation, calibration measurements have to be carried out for determining a characteristic of the capacitors.

The object of the present invention is the provision of a method and an apparatus of the aforementioned type making it possible to increase the measuring accuracy.

This object is achieved by the method having the features of claim 1 and by the apparatus having the features of claim 13.

Preferred variants of the inventive method and advantageous embodiments of the inventive apparatus form the subject matter of the dependent claims.

The method of the aforementioned type is inventively further developed in that for the automatic calibration of the fine interpolators a plurality of measurements are performed according to steps a) to c) and that assuming an equal probability distribution for the probability with which values are measured in a determined value range for the initial time difference and final time difference, corrections for the nonlinearities and/or drifts of the characteristics of the fine interpolators are calculated.

The apparatus of the aforementioned type is inventively further developed in that for the automatic calibration of the fine interpolators a computing unit is provided which, on the basis of a plurality of time difference measurements, carries out a statistical evaluation and assuming an equal probability distribution for the probabilities with which values are measured in a determined value range for the initial time difference and final time difference, corrections for nonlinearities and/or drifts of the fine interpolators are calculated.

The inventive apparatus is particularly suitable for performing the inventive method.

The first essential idea on which the invention is based is looked upon as the finding that from a determined probability with which determined values for the initial time difference or final time difference, respectively, occur, namely an identical probability over a determined value interval, and from a measurement of the frequencies with which the corresponding fine interpolator values occur, it is in principle possible to conclude with respect to the characteristic with which the conversion in question takes place in the given fine interpolator.

The second essential idea of the invention is that for automatic calibration of the fine interpolators a plurality of measurements must be performed and the measured fine interpolator values are statistically evaluated and assuming a distribution for the probability with which the individual values for the initial time difference or final time difference, respectively, are measured, the given corrected fine interpolator values are calculated.

An important finding of the invention is that in measuring methods where both an initial time difference and a final time difference is to be determined using fine interpolators, the expected measured values of the fine interpolators for elementary physical reasons, such as e.g. thermal variations and the like, themselves have a largely random distribution. This leads to an important essential idea of the invention whereby use is made of this statistical distribution of the actual measured values for calibrating the fine interpolators.

As in the inventive method the calibration of the fine interpolators is carried out on the basis of a frequency distribution of the actual measured values and not on the basis of randomly and separately generated signals, unlike in the prior art there is no need for separate calibration modes or cycles, either for generating randomly distributed calibration signals, or for the planned traversing and recording of calibration curves. This increases the effectiveness of the inventive method.

A first essential advantage of the inventive method is that in principle random drifts and nonlinearities of the fine interpolators can be corrected. In principle the characteristic need only be monotonic.

Another practically very important advantage is that with regards to the fine interpolators only a limited demand has to be made with respect to the linearity and drift behavior, because the corresponding corrections are very precisely carried out by the inventive method. This aspect in particular brings about considerable cost savings.

In the inventive method the corrections of the fine interpolators are calculated with the assumption that within a determined value interval all the initial time differences and final time differences are measured with the same probability. This situation is implemented if the time interval to be measured has no phase correlation relative to the digital clock.

A correction of the fine interpolator values can then easily be brought about in that a sum of the frequencies with which individual fine interpolator values occur is formed and that corrected fine interpolator values are obtained, in that the sum is divided by a constant and with regards to the value obtained account is only taken of the whole numbers.

This division can be particularly rapidly implemented computationally if as the constant a power of 2 is chosen and for division the corresponding number of "least significant bits" is rejected.

In order to avoid problems with very short pulses and very small signals, it is advantageous if for determining the digital raw value counting only takes place as from a second clock flank or edge following a starting event. A starting event can e.g. be a rising or falling edge of a starting signal or echo signal.

Another fundamental problem in conjunction with transit time measurements of the present type is that in the case of a starting signal or echo signal it must be clear which point in time is precisely associated with said signal. It is appropriately assumed that this time point is in the centre between a rising and a falling edge of said signals. So that the rising and falling edges can in each case be taken into consideration, in all four fine interpolators are used or the inventive apparatus has a total of four fine interpolators, respectively.

The fine interpolators appropriately have in each case a time-analog converter (TAC) and an analog-digital converter (ADC).

An important advantage of the inventive apparatus is that with regards to said components high precision demands are no longer made, so that e.g. the TAC can be a RC-element.

The starting signal for the time measurement can be coupled out and derived from the light pulses emitted by a light source. However, with particular preference by the starting signal is derived from control electronics of the light source. Such a structure can be implemented with less expensive components.

The electronics guiding the starting signal and which is finally supplied to the time measuring device can also suffer from drifts, e.g. temperature or ageing drifts, which have a negative effect on the measuring accuracy. To be able to eliminate such drifts, from the method standpoint it is preferred for a reference range or distance to be measured, in that reference pulses are conducted across an optical reference distance.

To avoid a further drift source being introduced into the measuring system through a second optical detection channel, i.e. a second optical detector, in a further important aspect the invention proposes detecting the reference pulses with the same detector as the echo pulses. So that there is no time overlap between the reference pulses and echo pulses, the optical path of the reference pulses must differ, e.g. must be chosen much shorter than the shortest optical path of the echo pulses.

From the apparatus standpoint it is then appropriate for there to be a device for subdividing the light pulses into in each case a measurement pulse and a reference pulse, accompanied by a measurement optics for conducting measurement pulses onto the object and for conducting the measurement pulses reflected by the object as echo pulses to the detector and a reference optics for conducting the reference pulses in the direction of the detector, the optical path of the reference pulses being shorter or longer by at least one offset distance than the optical path of the measurement pulses and where the detector is used for the alternating quantitative detection of both echo pulses and reference pulses.

Into the definitive determination of the range value is introduced in this method variant a difference between the range measured with the aid of the echo pulses and the reference range. This difference can be particularly accurately determined if the reference pulses and echo pulses have roughly the same height or level. Thus, advantageously the optical path of the echo pulses contains a controllable pulse attenuator for the planned attenuation of the echo pulses, so that they are dimensionally comparable with the reference pulses.

A first fundamental idea of this variant is that for the detection of the echo pulses and reference pulses use is made of the same detector. Both the reference measurement and the actual range measurement consequently always take place with the same components, so that it is possible to exclude possible errors via component tolerances and as a result a significantly improved measuring accuracy can be obtained. The measurement of the reference and the range can consequently only take place in alternating manner and not simultaneously. In the present context an alternating measurement essentially involves a successive measurement of echo pulses and reference pulses. The invention in particular covers typical situations where e.g. 100 echo pulses are measured and then one reference pulse. It is important that the measurement of echo and reference pulses cannot take place simultaneously in the same detector.

A further essential idea of this variant is that the optical path of the reference pulses must be longer or shorter by at least one offset distance than the optical path of the measurement pulses. It is possible in this way to time separate reference pulses and echo pulses sufficiently that they are not superimposed on one another during detection in the detector and consequently a separate pulse identification is possible and a reference range can be determined.

A third fundamental idea is that in the optical path of the echo pulses is provided a pulse attenuator with which the echo pulses can be attenuated in targeted, controlled manner, so that they are dimensionally comparable with the reference pulses. As a result of roughly the same height of the reference and echo pulses, there is a further increase in the accuracy of the time determination, which presupposes the derivation of a time point from a pulse with initially a random time behavior. By measuring the echo pulses and reference pulses with the same components, all possible drift causes are incorporated into the measurement of both ranges or distances. Through forming a difference between the starting pulse signal/reference signal distance and the starting pulse/echo signal distance, a so-called difference distance is performed. A drift which may occur is computationally eliminated by this difference formation.

Thus, this variant of the inventive method is characterized in that all measurements of reference pulses and echo pulses are carried out with the same components, so that there is only one optical receiver both for the reference and for the echo measurement. Moreover, an optical path length for the internal reference is shorter than an optical path length for the actual range measurement. It is also important for the invention that for the signal strength or intensity of the echo signals regulation takes place to the corresponding reference signal value with the aid of a controllable pulse attenuator.

Dimensionally comparability can e.g. be a level or also a surface/area comparability of the pulses.

The light source can be of a random nature which is able to supply adequately short pulses. Use is preferably made of lasers with visible light or infrared light. It is also possible to use VCSELs or RCLEDs.

The detectors can e.g. be known photodiodes.

Basically, also the optical path through the reference distance can be longer than the optical path for the echo pulses. The only important point is that the difference must be adequate for there to be no time overlap of the pulses in the detector.

In a further particularly preferred development of the inventive apparatus, in the optical path of the measurement pulses and/or in the optical path of the reference pulses optical fibers are provided. Defined optical path distances can be particularly easily implemented with the aid of optical fibers. In particular, the inventively required, adequate difference between the optical path length for the measurement pulses and the optical path length for the reference pulses can be implemented very easily and in space-saving manner. Moreover, structures with optical fibers are comparatively insensitive with respect to mechanical vibrations.

Basically, the optical fibers can be single mode fibers, which has the advantage that only one electromagnetic mode is propagated in the light guide and consequently very short pulses are possible. However, for many applications multimode glass fibers are appropriate, because higher intensities can be obtained at the detector with such components.

The pulse attenuator can have a mechanical construction in a simple case and can e.g. be a controllable mechanical diaphragm or a gray wedge filter wheel.

The control of the pulse attenuator is preferably continuously tracked and for this purpose the range and reference measurement is repeatedly performed. The readjustment of the echo pulses is limited as a result of the speed of the pulse attenuator. Consequently a faster readjustment can be obtained if the pulse attenuator is an electrooptical, magnetooptical or acoustooptical modulator or an AOTF.

The pulses of the starting signals, echo signals and reference signals are generally not symmetrical for elementary electronic reasons, so that the assumption of a time point in the centre between two time points at which there is a rise above or a drop below a comparator threshold is incorrect. Another advantageous variant of the inventive method comprises the compensation of pulse widths of the starting signals, echo signals and/or reference signals. For carrying out such compensations recording e.g. takes place of tables in which are filed at the individual pulse height values in each case a given time point relative to the switching time points of a comparator.

Appropriately prior to starting up an actual measurement operation, tables are recorded for the compensation of the fine interpolators and/or for pulse compensation. The pulse compensation tables are preferably generated within the framework of a basic alignment prior to the delivery of the equipment to a customer.

One or more tables for the compensation of the fine interpolators can be continuously tracked during the measurement operation. In this way account is taken of specific drifts, which e.g. occur with a minute or hour scale, such as temperature drifts.

With respect to the accuracy of the measured results, it is also advantageous to repeatedly perform the range measurement and to average it over a plurality of measured values. The measuring accuracy can then be increased corresponding to elementary statistics. To also be in principle in a position to measure the range of moving objects, it is appropriate to carry out a moving averaging for the measured values instead of taking account of all the recorded measured values.

Further advantages and characteristics of the present invention are described hereinafter relative to the attached drawings, wherein show:

FIG. 1A diagrammatic view of an optoelectronic measuring apparatus, where a starting signal is optically derived from a light source.

Figure 2:
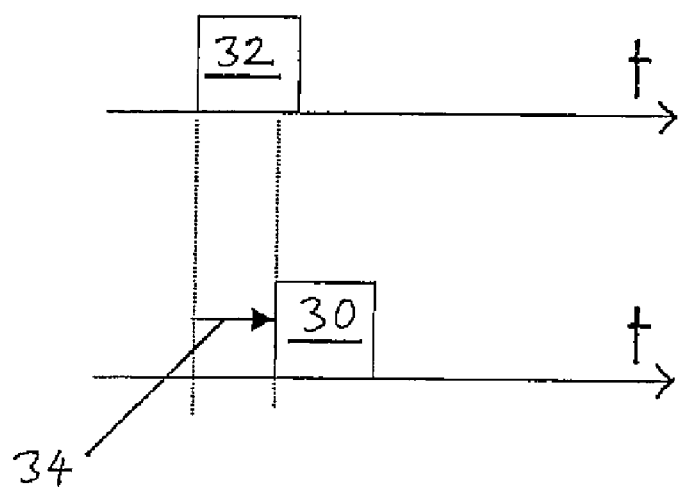

FIG. 2 Signal patterns for the apparatus of FIG. 1.

Figure 3:
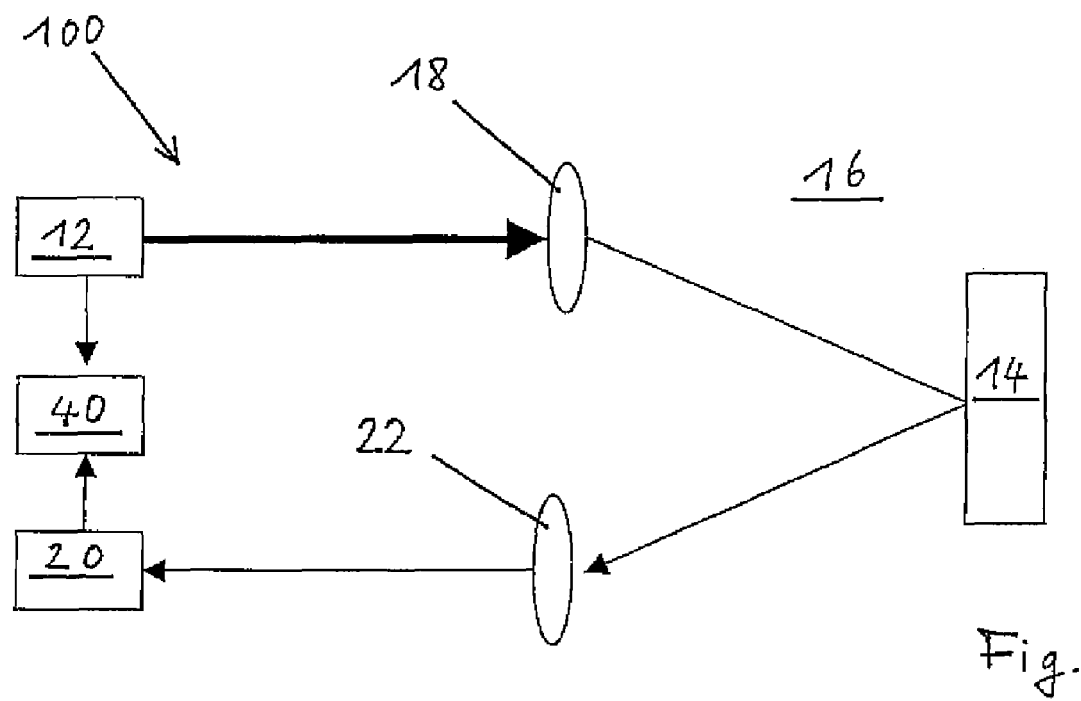

FIG. 3 A diagrammatic representation of an optoelectronic range measuring apparatus, where a starting signal is electrically derived from a light source.

Figure 4:
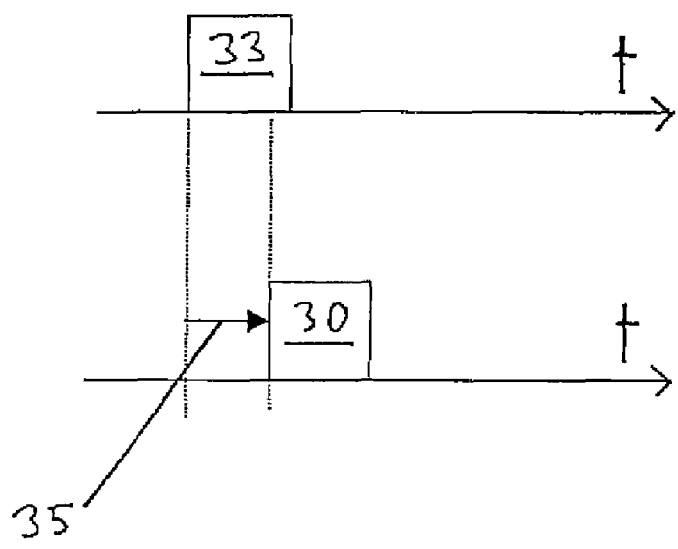

FIG. 4 Signal patterns for the apparatus of FIG. 3.

Figure 5:
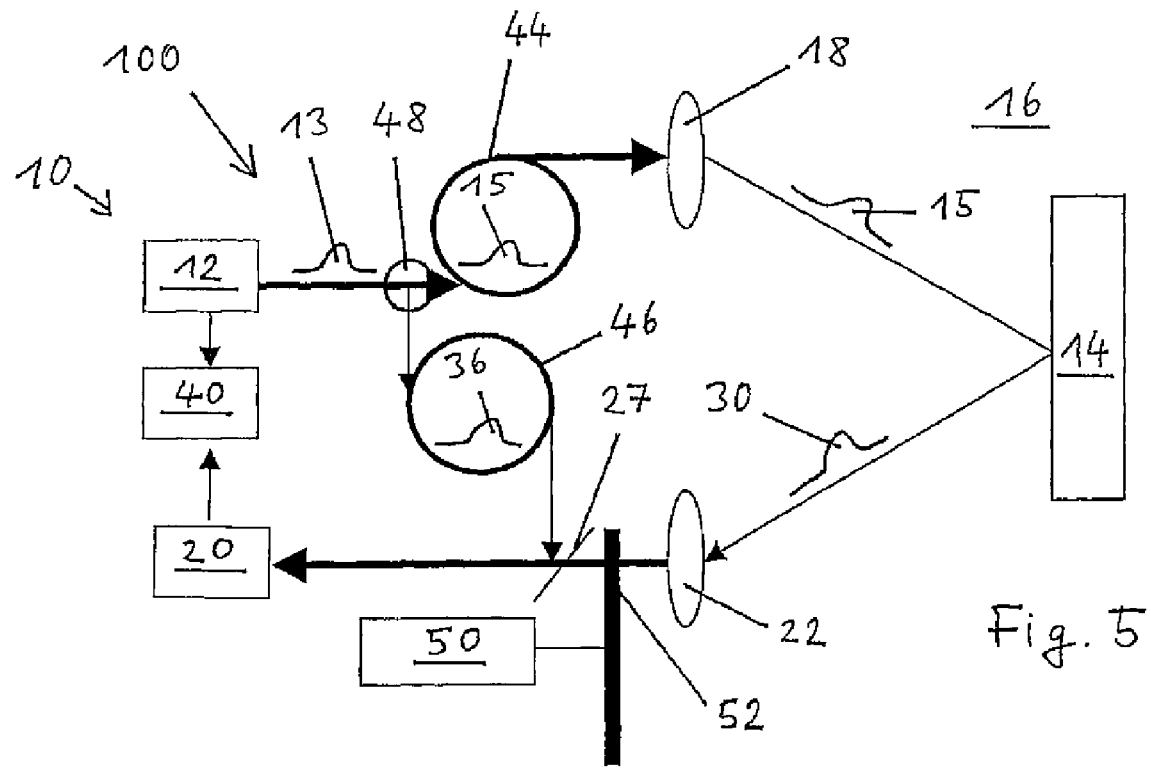

FIG. 5 A diagrammatic view of an embodiment of an inventive apparatus.

Figure 6:
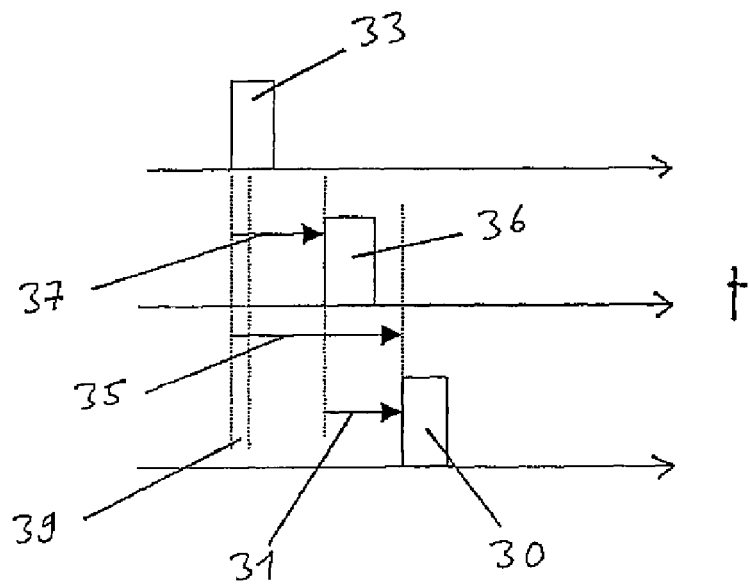

FIG. 6 Signal patterns for the apparatus of FIG. 5.

Figure 7:
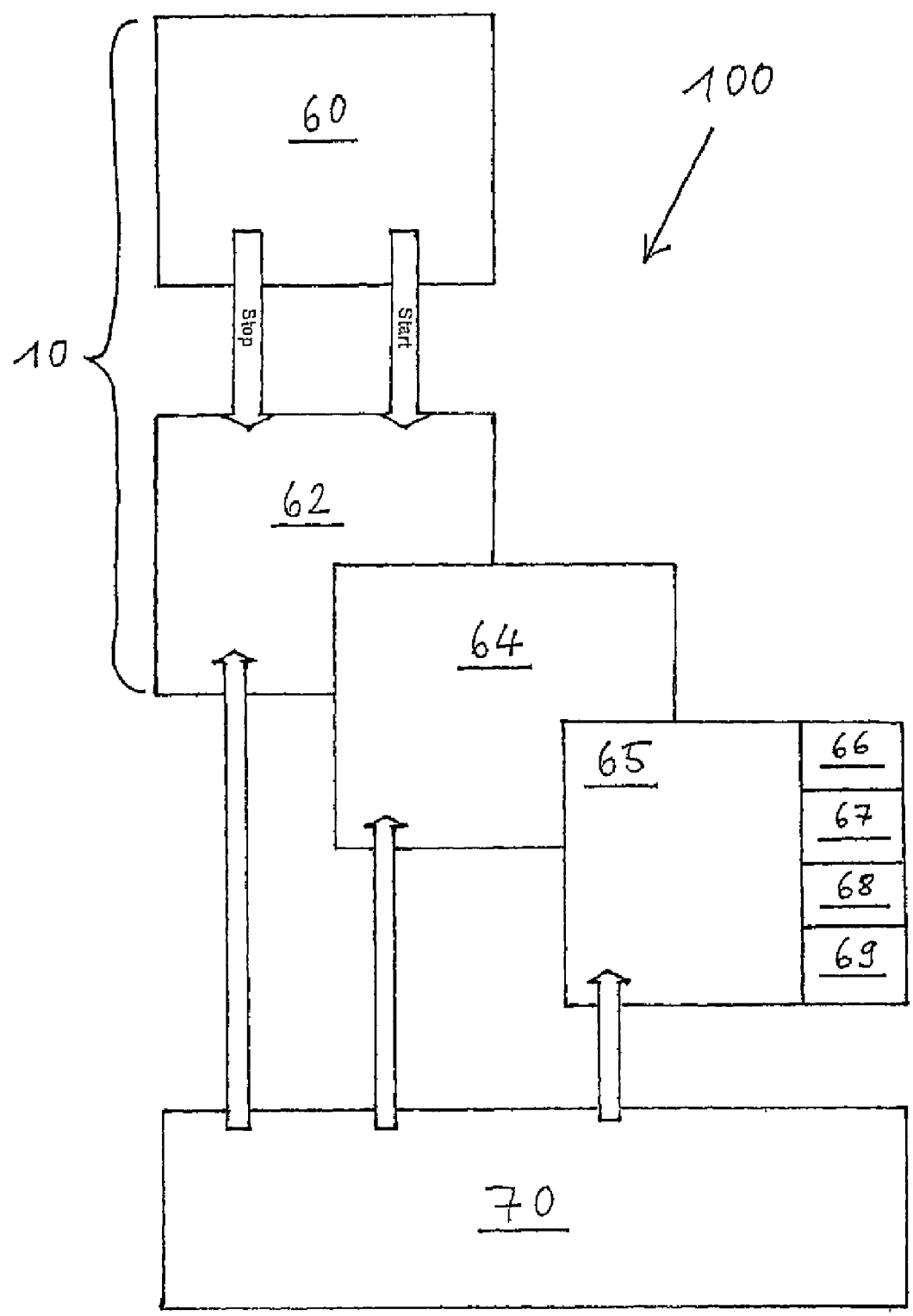

FIG. 7 A block diagram of essential components of an inventive apparatus.

Figure 8:
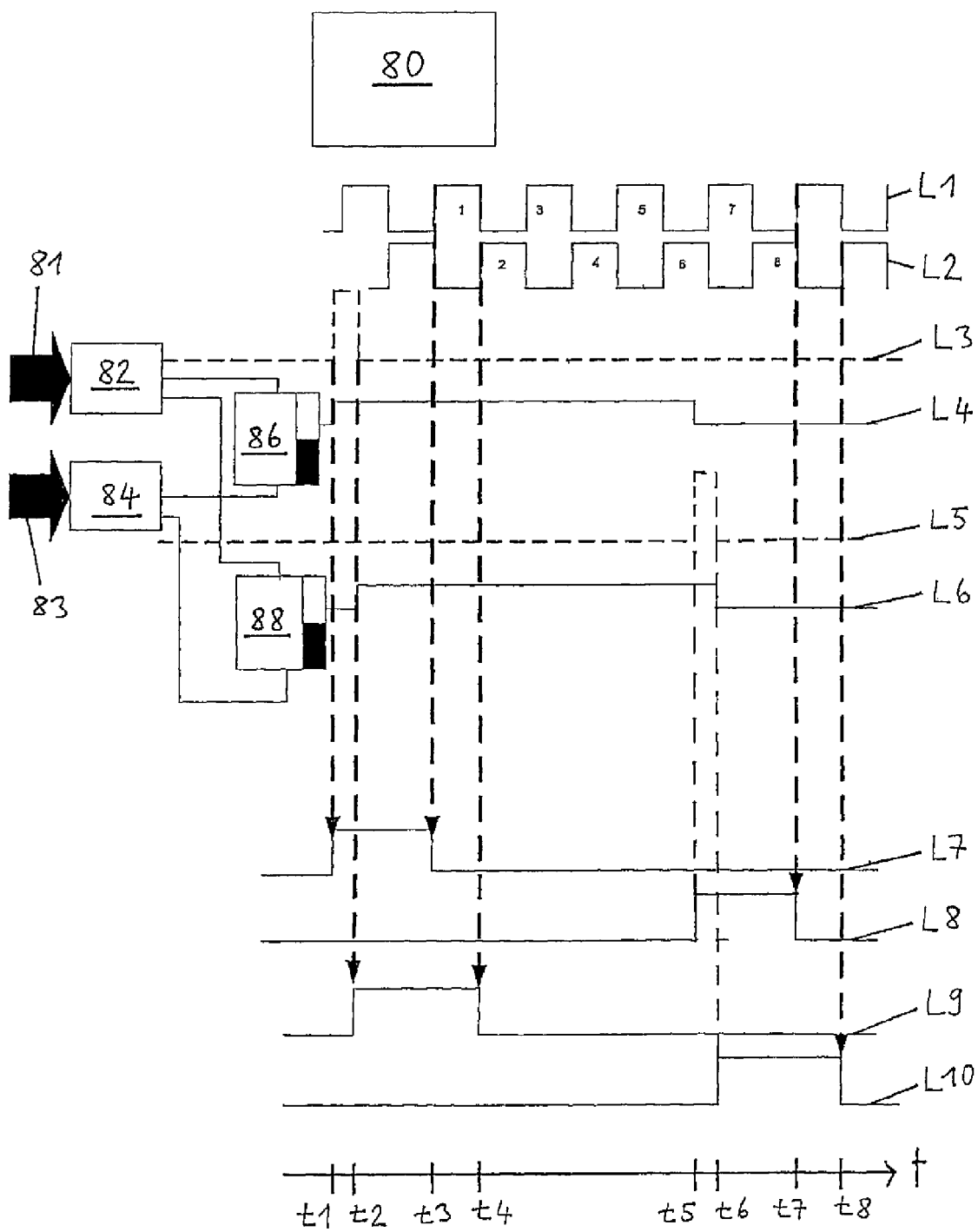

FIG. 8 The signal patterns relevant for the time measurement for an inventive apparatus.

FIG. 9 An example of a correction table for a fine interpolator.

Figure 10:
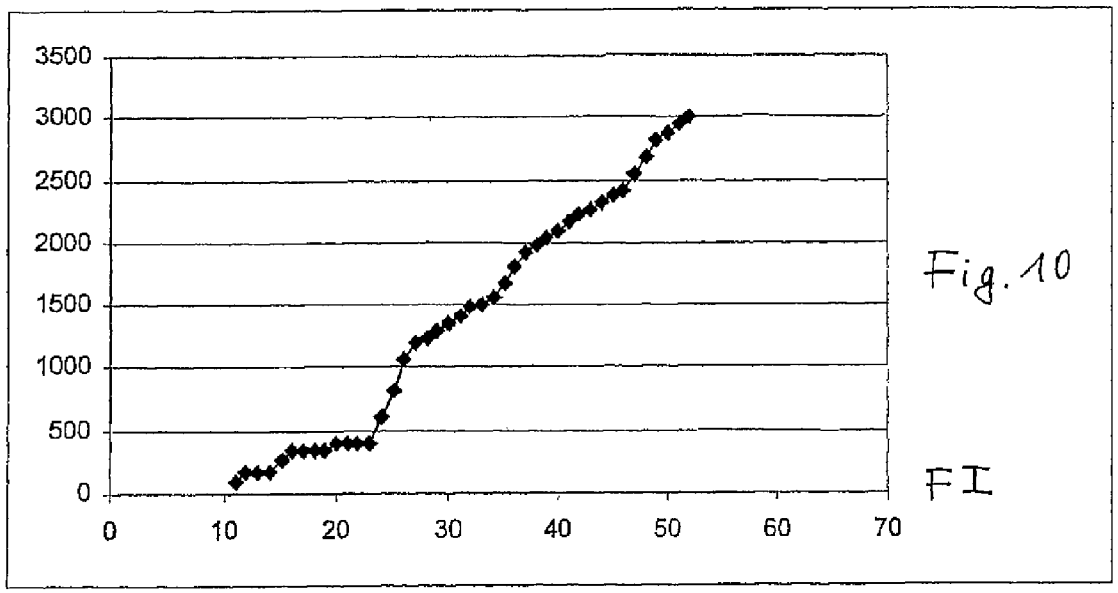

FIG. 10 A graph with cumulative measurement frequencies, plotted against the fine interpolator values.

Figure 11:
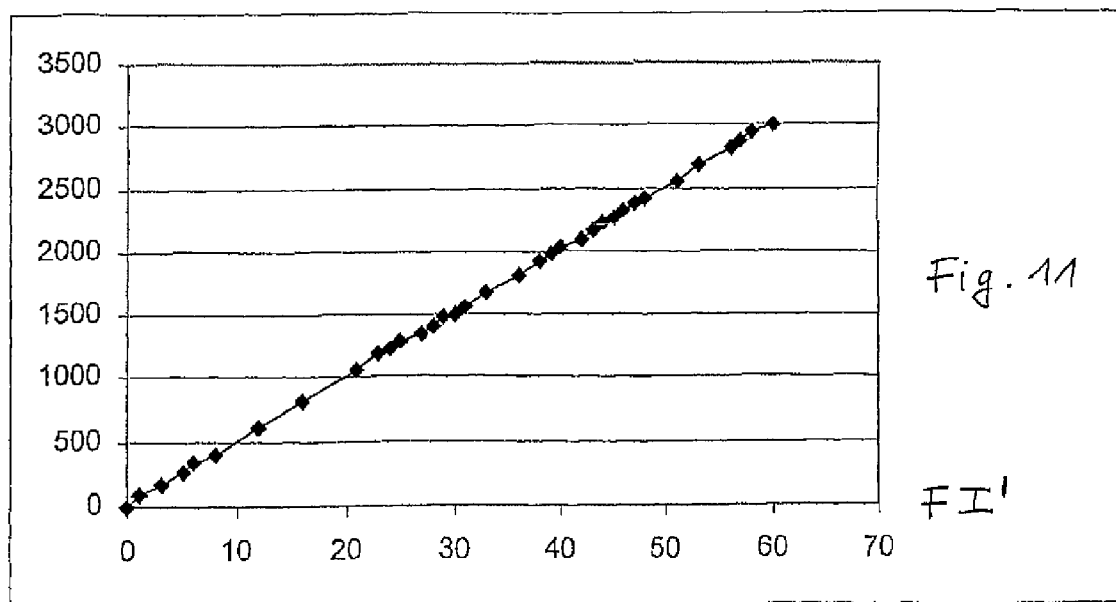
Figure 12:
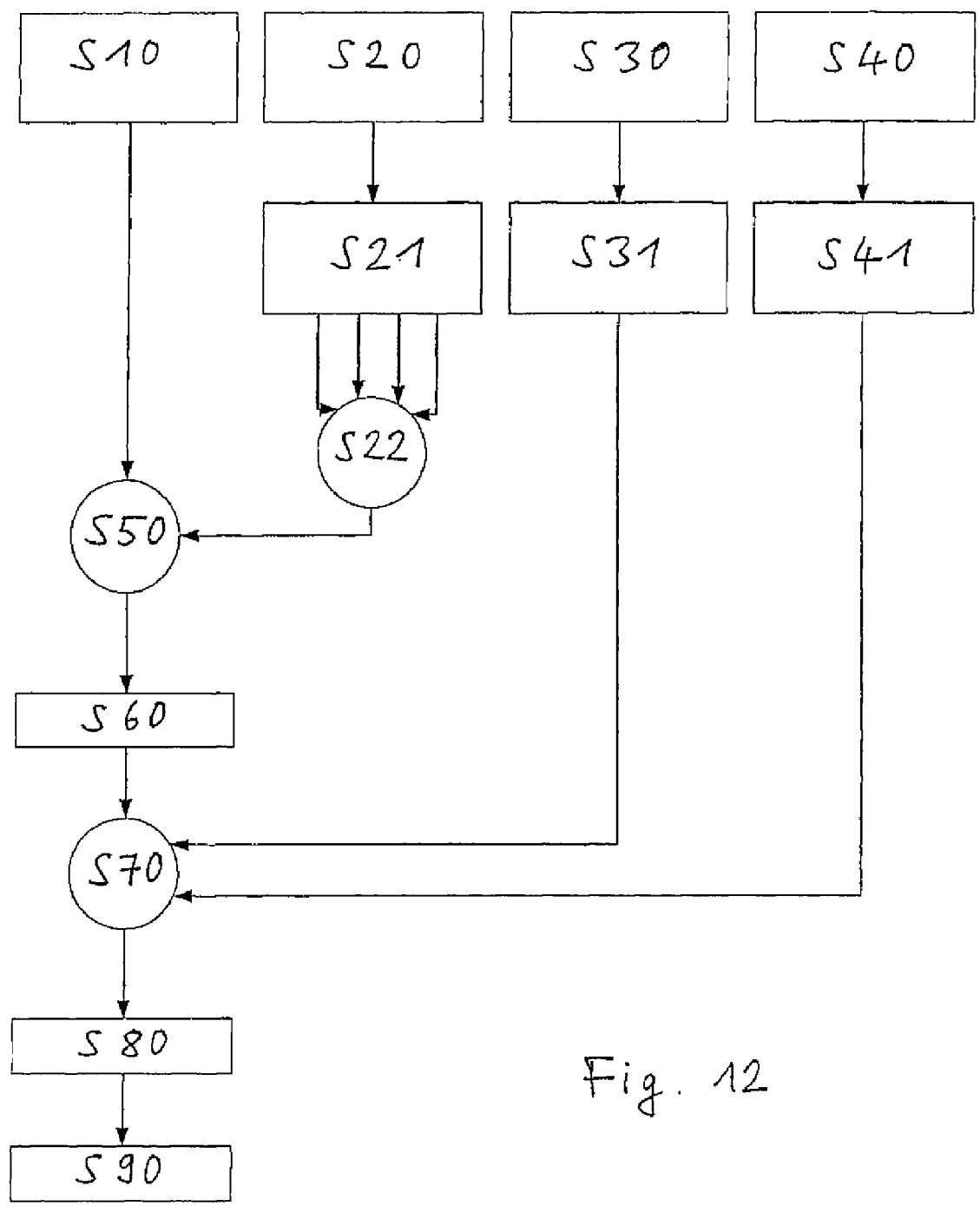

FIG. 11 A graph with cumulative measurement frequencies plotted against a corrected fine interpolator value; and FIG. 12 a diagrammatic flow chart with the essential steps for determining the range of an object.

A starting signal for the time measurement can be obtained in different ways. Two of these methods are described relative to FIGS. 1 to 4. Herein, the terms "signal" and "pulse" are occasionally considered to have the same meanings. For the following description of the invention "pulse" is usually understood to mean an optical signal, whereas "signal" is used to mean an electrical or electronic signal.

Firstly, with reference to FIGS. 1 and 2, a description is given of a method in which a starting signal is obtained from an optical starting pulse. FIG. 1 shows an apparatus 100 for contactless optical range measurement. There a light source 12 emits light pulses, which are conducted via a lens 18 onto an object 14 in a detection area 16. Following reflection on the object 14, said light pulses, which are now referred to as echo pulses 30, are passed via a lens 22 to a detector 20, where detection takes place. Therefore the detector 20 is also referred to as an echo receiver. The signal of said detector 20, also called an echo signal 30, is supplied as a stop signal to the measuring unit. In order to now obtain a starting signal for the time measurement and therefore for determining the range of the object 14, in this method, from the light pulses produced by the light source 12 a part is coupled out by means of a semireflecting mirror 26 and supply takes place via a deviating mirror 28 to a further detector 24. The starting or output signal of the further detector 24, which is also called a starting pulse receiver, is supplied to a downstream measuring unit for processing.

FIG. 2 shows the time characteristics or behavior of an echo signal 30 detected in detector 20, as well as the optical starting signal 32 detected in the further detector 24. From a time difference, indicated by an arrow 34 in FIG. 2 and optionally after carrying out further corrections and compensations, conclusions can be drawn regarding the range of object 40 from apparatus 100. FIG. 2 more particularly makes it clear that there can be a time overlap of the echo signal and optical starting signal 32, because they are detected in different detectors.

Through the use of two optical detectors it is also possible to establish very short ranges or distances, e.g. directly upstream of lenses 18, 22.

In this method the prerequisite for a high measuring accuracy, i.e. low measurement errors, is that the detectors 20, 24 behave in a virtually identical manner. Thus, it is a disadvantage of this construction that the always present and differing component tolerances, even if they are of a limited nature, necessarily lead to different characteristics of the two detectors 20, 24. These differences are directly manifested in measurement errors. Such errors can e.g. be in the form of transit time differences, which are highly temperature-dependent. Basically, such inaccuracies can admittedly be compensated by temperature measurement and taking account of appropriate compensations, but these are not necessarily long term-stable.

In an alternative variant of the method a starting signal is not directly generated from the emitted laser light, but is instead obtained from an electrical control of the light source. This method is described relative to FIGS. 3 and 4. Equivalent components carry the same reference numerals therein as in FIGS. 1 and 2 and are not separately described. FIG. 3 diagrammatically shows that a signal is derived from the light source 12 and supplied to a time measuring device 40.

Here this is an electrical starting signal 33, whose time slope is shown in FIG. 4. In addition, an output signal of detector 20, namely an echo signal 30, is fed into the time measuring device 40. FIG. 4 also shows the time slope of echo signal 30. As in the case of the method described relative to FIGS. 1 and 2, also here there can be a time overlap of starting signal 33 and echo pulse 30, because they are physically obtained in different ways. The range of object 14 can be obtained from the time difference between starting signal 33 and echo pulse 30, indicated by an arrow 35 in FIG. 4.

The advantage of this method is that simpler and in particular less expensive components can be used.

An embodiment of an inventive apparatus is described relative to FIGS. 5 and 6. There, equivalent components carry the same reference numerals as in FIGS. 1 to 4.

The apparatus 100 shown in FIG. 5 has as essential components a sensor unit 10 with a light source 12 and a detector 20. The light source 12 emits light pulses 13, which in a device 48 are divided up into measurement pulses 15 and reference pulses 36. The device 48 can e.g. be a semireflecting mirror. Typically only a few percent of the incoming intensity is reflected out as a reference pulse. The measurement pulses 15 are then conducted through an optical fiber 44, which can also be called the measurement fiber. By means of a lens 18 as part of the measurement optics the measurement pulses 15 are then directed to an object 14, whose distance or range from the sensor unit 10 is to be measured. The measurement pulses 15 are reflected at object 14. The reflected measurement pulses 15, which can also be called echo pulses 30, arrive at a lens 22 as another part of measurement optics and then pass through a pulse attenuator 50 and finally reach detector 20, where they are detected. An output signal of detector 20 is fed into a time measuring device 40. An electrical signal derived from light source 12 is also supplied to time measuring device 40. Said electrical starting signal is the image of the laser diode current. The laser light itself is generated with a lag of a few picoseconds. The electrical starting pulse is used as the reference point for the reference and range measurement. The pulse attenuator 50 is an adjustable mechanical diaphragm 52 in the examples shown.

In order to avoid the inaccuracies and measurement errors described above in conjunction with FIGS. 1 to 4, a so-called reference distance is integrated into the sensor according to the present invention. With the aid of said distance it is possible to eliminate errors, e.g. drifts.

FIG. 5 diagrammatically shows the structure of such a reference distance. The reference pulses 36 derived in device 48 are conducted via an optical fiber 46, which can also be called a reference fiber, onto a semireflecting mirror 27 and from the latter to detector 20, where detection takes place. A corresponding detection signal is again supplied to time measuring device 40. The reference pulse is generated in the optical receiver via an optical short-circuit delayed in a clearly defined manner. It represents the reference range for the measurement. The echo pulse is generated in the same optical receiver as the reference pulse. It is reflected by the measurement target, i.e. the object. The time lag with respect to the emitted laser pulse constitutes the measure for the range.

The time characteristics or behavior of the individual signals supplied to time measuring device 40 is diagrammatically illustrated in FIG. 6. First of all, the time measuring device 40 firstly receives an electrical starting signal 33 derived from light source 12. Through the reference distance essentially formed by optical fiber 46 a reference pulse 36 then arrives at detector 20. An arrow 37 in FIG. 6 indicates a time lag between the electrical starting signal 33 and the time point at which the reference pulse 36 is detected in detector 20.

Once again time-lagged by a transit time with respect to the object 14 to be detected and by a delay or lag distance in the optical fiber 44 in the equipment, the detector 20, which can also be called an echo receiver, is supplied with the echo signal 30. The difference between the optical path length in the optical fiber 46, which can also be called the reference fiber, and that in the optical fiber 44 also called the measurement fiber, essentially corresponds to the offset distance. The time difference relative to the electrical starting signal 33 is indicated by an arrow 35 in FIG. 6 and the transit time difference relative to reference pulse 36 by an arrow 31. In order to obtain in each case substantially identical conditions for measuring the reference and echo pulses, according to the invention and with the aid of the pulse attenuator 50 the echo pulses 30 are attenuated in such a way that they largely correspond to the reference pulses 36. The pulses can e.g. be regulated to substantially coinciding levels or pulse heights, but alternatively also to roughly identical surface areas of the peaks. The regulation to the same height or surface has the advantage that a drift of the pulse shapes, which would actually make necessary a tracking of compensation tables, essentially has no effect, because the action on the reference and echo pulse is the same, so that elimination occurs. In order to obtain a desired height for the reference pulse, the optical path can incorporate a fixed pulse attenuator, e.g. a grey wedge filter wheel which can be adjusted in a defined manner.

The measurement of the distances then takes place alternately between starting signal 33 and reference pulse 36 or between starting signal 33 and echo pulse 30, respectively. Through difference formation of the in each case measured values possible drifts, given the reference numeral 39 in FIG. 6, can be eliminated.

In this embodiment of the invention the light source 12, which can also be called a transmitter or transmitting diode, is coupled to a glass fiber, which is subdivided into a measurement fiber 44 and a reference fiber 46, the measurement fiber 44 being longer by the offset distance than the reference fiber 46. Both for the range measurement and for a reference measurement, the starting signal 33 is derived from the electrical control of the transmitting diode. The measured value for the reference distance can be averaged over a longer time period.

FIG. 7 diagrammatically shows the essential components of an inventive apparatus 100 for optoelectronic contactless range measurement. The essential part of apparatus 100 is a sensor unit 10, which comprises the above-described optoelectronic 60 and a measurement core 62. For the precise determination of the time differences there is provided both a digital data acquisition 64 and an analog data acquisition 65 with in all four fine interpolators 66, 67, 68, 69, All these components are controlled with the aid of an evaluation/control computer 70, to which are also supplied the respective data for processing purposes.

A sequence control for the measurements is implemented by a FPGA. Said FPGA automatically carries out the measurements to obtain raw values and in doing so controls the laser and reads out the ADC. It can also regulate a diaphragm motor of the pulse attenuator. The light source 12, which is in the form of a laser, is fired and the measurement pulses of the electrical starting signal as well as the optical detector signals are supplied to a comparator and then the FPGA. The FPGA converts the time-dependent signals into pulse widths, fine interpolator values and digital counting pulses. The pulse widths and fine interpolator values are then converted into digital signals in a time-amplitude converter (TAC) and then in an analog-digital converter (ADC). A measurement computer receives the measured values from the FPGA and adapts them for transmission to a PC. The raw data of several measurements are collected and transmitted to the PC.

In parallel thereto, there is a regulation of the pulse attenuator 50 with regulatable diaphragm 52 for the echo pulse 30. This regulation can e.g. take place by means of a pulse width modulation for an operation with a direct current motor. Alternatively a stepping motor can be used.

For diaphragm regulation the FPGA receives a preset desired value. It simultaneously reads from the ADC an actual value of a pulse width of the measured value. Depending on whether said measured value is the measured value of a reference pulse 36 or an echo pulse 30, an actual/desired value comparison is performed for the echo pulse and in the case of variations a d.c. voltage pulse of variable length is generated until a control state is reached. In the case of very significant variations the diaphragm motor operates continuously. On approaching the desired value the pulses are continuously shortened to 10 ms length. The pulse frequency can e.g. be 10 pulses/sec.

The time lapse for the signals relevant for the time measurement is explained relative to FIG. 8. An electrical starting pulse 81 and an echo or reference pulse 83 are in each case supplied to comparators 82, 84. The outputs of said comparators are connected to flip-flops 86, 88. By means of the outputs L4 and L6 of flip-flops 86, 88 time measurement takes place. Firstly by comparing outputs L4 and L6 with a clock signal L1 and an inverted clock signal L2 which can be derived from a clock 80, a digital raw value of the measurement is obtained. This digital raw value is the rough measurement of the range, accurate to within half a clock period and corresponds to a numerical value between the starting signal L3 and the echo/reference signal L5. To avoid the difficulties associated with very short pulses, the measurement logic only counts the second rising edge of the clock L1 following on to a rising edge of starting signal L3. Correspondingly on a falling edge of starting signal L3 only the second rising edge of the inverted clock signal L3 is counted. The counting behavior is the same for the echo/reference signal L5, where once again in each case only the second rising edge is counted.

An initial time difference between the starting signal L3 and the first edges counted for the digital raw value as well as a final time difference between the echo/reference signal L5 and the last edge counted for the digital raw value is measured with the aid of fine interpolators. In all, in the examples shown use is made of four fine interpolators, whose input signals are designated L7, L8, L9 and L10.

The time lapse of the signals is explained relative to the time scale in the lower area of FIG. 8.

The time point t1 corresponds to a rising edge of starting signal L3. This also represents the start of the time measurement for the first fine interpolator L7. At time point t2 the starting signal L3 drops again and then the third fine interpolator L9 starts to measure. At time points t3 and t4 the time measurement of fine interpolators L7 and L9 respectively is ended, which corresponds to a rising edge of clock L1 or the inverted clock L2, respectively.

In analogical way the fine interpolators L8, L10 are started by the rising or falling edge of the echo/reference signal L5, respectively, and ended by the in each case second-following, rising edge of clock signal L1 or the inverted clock L2, respectively. This takes place at time points t5 to t8.

The four fine interpolator values are summated to an analog raw value and in this sum is positively entered the fine interpolator values belonging to the initial time difference and are negatively entered the fine interpolator values belonging to the final time difference. Prior to said summation, all the fine interpolator values are individually compensated, as will be explained in greater detail hereinafter. The thus obtained analog raw value can be looked upon as the fine range for the range measurement.

The analog raw value and digital raw value are summated to a complex raw signal, which must then be converted into the actual measurement result by further compensation steps.

Correction tables are recorded to be able to compensate nonlinearities, offset and slope errors of the fine interpolators.

For each individual measurement four fine interpolator values are produced, which reproduce the correction values with respect to the clock edge for the rising and falling edges of the starting and echo pulses. The more accurate these fine interpolator values, the more precise the individual measurement and therefore also the final result.

In the examples shown the frequency of clock 80 is 75 MHz. The times to be measured by the fine interpolators can therefore assume values between 13 ns and 26 ns. During these time gates a capacity is charged by approximately one volt and the capacitor voltages being in each case an equivalent to the time.

In detail, the correction tables are obtained as follows: the AD-converter has a resolution of 12 bit at 5 V, which leads to an output value of the fine interpolators of approximately 800 to approximately 1600. As a result of the indicated nonlinearities, offset and slope errors in reality displaced and/or spread values must be expected. However, these variations should be corrected by means of a correction table.

When forming the table 1000 frequency stages should on average have 64 events, which means that 64000 measured values are required. In the case of an expected spread of the AD-converter values of approximately 800, then for each fine interpolator value there are approximately 80 events. A table is now produced in which for each fine interpolator value obtained a counter is counted up. After 64000 measurements a frequency distribution of the in each case measured fine interpolator values is obtained. Such a distribution is simultaneously measured for all four fine interpolators.

FIG. 9 shows an example of a table in which in the first line are entered the fine interpolator values, designated by FI. The second line contains the frequency H with which the respective fine interpolator value FI was obtained for in all 3000 measurements. Finally line 3 contains the summated frequency S. For example, said summated frequency S is constantly 3000 as from the fine interpolator value FI=53 to FI=64, because none of these values was reached in any of the 3000 measurements performed.

FIG. 10 shows the summated frequency S, plotted against the fine interpolator values FI. FIG. 10 immediately makes it clear that the fine interpolator values FI are not uniformly distributed. However, as the time interval to be measured has no phase correlation with respect to the clock signal L1, all the fine interpolator values must be measured with the same frequency. Thus, the summated frequency S must be linearly distributed, because mathematically the fine interpolator values are uniformly distributed between the clock edges. Thus, it is permissible to carry out a linearization of the measured summated frequency S.

The actual correction is now calculated. The correction value FI' in each case corresponds to the whole numbers on dividing the summated frequency S by 50. This corresponds to a total of 60 frequency stages for 3000 measurements. The table of FIG. 9 also records the remainder R on dividing the summated frequency S by 50. Thus, for a fine interpolator value 23 there is e.g. a summated frequency S of 406. Division by 50 gives a corrected fine interpolator value of FI'=8 with a remainder of R=6.

Instead in the practically implemented example explained above 64000 measured values were recorded and the summated frequency S is divided by 64. This can be very simply and rapidly obtained by rejecting the 6 least significant bits. A table is now obtained where for each random fine interpolator value a correction value of 0 to 1000 is outputted. The frequency distribution for the corrected fine interpolator values is then substantially linear. Such a table is recorded for all four fine interpolators.

For the values of the table of FIG. 9, FIG. 11 shows the summated frequency S plotted against the corrected fine interpolator values FI'. It is immediately clear that the summated frequency S, as required, now has a substantially linear path.

Appropriately, prior to the start of the actual measurement operation, the reference is very precisely determined with a plurality of measurements, e.g. 20000 measurements can be carried out for this. During the subsequent measurement operation it is e.g. possible to use every 100th measured value for tracking of possible reference value drifts. Here, it is also possible to carry out suitable averaging with prior plausibility checks.

By means of FIG. 12 the essential steps for obtaining the final measured result from the measured times are explained.

Firstly, in step S10 the digital raw value is obtained by comparing the starting signal and echo/reference signal with the clock signal L1 and the inverted clock signal L2. Moreover, in step S20, four fine interpolator values are obtained which are compensated by means of four separate and constantly updated compensation tables. In step S22 these separately compensated fine interpolator values are summated to the analog raw value. In step S50 the analog raw value obtained in step S22 as well as the digital raw value from step S10 are summated. This gives in step S60 the complex raw value or range raw value.

Within the framework of a basic alignment of the equipment, in steps S31 and S41 compensation tables are produced for the pulse width of the starting pulse and echo/reference pulse. The pulse widths of the starting pulse are determined in step S30 and the pulse widths of the echo/reference pulse in step S40. From the tables obtained in S31 and S41 there are further additive correction values to the range raw value summated in step S70.

As a final step in S80 it is possible to subtract the offset value resulting from the reference measurement. So a true range value is obtained in step S90.

The invention relates to an optoelectronic sensor for contactless range measurement. The invention more particularly relates to a possibility for improving or controlling, respectively, inaccuracies and drifts of fine interpolators which occur.

It is assumed that with such a statistical method each value measured by the fine interpolators occurs with the same frequency. By monitoring the number of values measured in each case information can be gathered regarding the nonlinearity and the distribution can be given a corresponding weighting. This also applies to the monitoring of the mean value, a correction being possible on diverging from zero.

In the case of a method and apparatus according to the invention the measured results of fine interpolators are statistically evaluated, in which a divergence in the uniformity of the distribution is an indication for a correction of the linearity and a divergence of the mean value for a drift compensation.

The invention claimed is:

1. Method for the optoelectronic contactless range measurement according to the transit time principle,
   in which a distance of an object from a sensor unit is determined from a time difference between a starting signal and an echo signal, which is derived from an optical measurement pulse reflected by the object and for determining the time difference the following steps are performed:

a) by comparing the starting signal and echo signal with a digital clock a digital raw value is obtained,
b) with the aid of at least two fine interpolators an initial time difference between the starting signal and the beginning of the digital raw value as well as a final time difference between the echo signal and the end of the digital raw value is determined,
c) the fine interpolators are in each case supplied with analog signals corresponding to the initial time difference or final time difference, respectively, and are converted to a digital initial time difference or digital final time difference, respectively,
wherein
for the automatic calibration of the fine interpolators a plurality of measurements of the time difference between a starting signal and an echo signal are carried out according to steps a) to c), where the time intervals to be measured having no phase correlation with the digital clock and
where, assuming an equal distribution for the probability with which the values in a given value interval for the initial time difference and final time difference are measured, corrections are calculated for at least one of nonlinearities and drifts of the characteristics of the fine interpolators.

2. Method for the optoelectronic contactless range measurement according to the transit time principle,
in which a distance of an object from a sensor unit is determined from the time difference between a starting signal and an echo signal, which is derived from the optical measurement pulse reflected by the object as echo pulse and
in which a reference distance is measured from a time difference between a starting signal and a reference signal derived from a reference pulse and which is directed over an optical reference distance and detected with the same detector as the echo pulses,
in which for the determination of the time difference in each case the following steps are performed:
a) by comparing starting signal and echo/reference signal with a digital clock a digital raw value is obtained,
b) with the aid of at least two fine interpolators an initial time difference between the starting signal and the beginning of the digital raw value as well as a final time difference between the echo/reference signal and the end of the digital raw value are determined,
c) to the fine interpolators are in each case supplied the analog signals corresponding to the initial time difference or final time difference, respectively, and converted into a digital initial time difference or digital final time difference, respectively,
wherein
for the automatic calibration of the fine interpolators a plurality of measurements of the time difference between a starting signal and a reference signal are carried out according to steps a) to c), the time intervals to be measured having no phase correlation with the digital clock and
where, assuming an equal distribution for the probability with which the values are measured in a given value interval for the initial time difference and final time difference, corrections are calculated for at least one of nonlinearities and drifts of the characteristics of the fine interpolators.

3. Method according to claim 1 or 2,
wherein
a reference distance is measured, in that the reference pulses are conducted over an optical reference distance.

4. Method according to claim 3,
wherein
the reference pulses are detected with the same detector as the echo pulses.

5. Method according to claim 1 or 2,
wherein
pulse widths of at least one of the starting signals, the echo signals and the reference signals are compensated.

6. Method according to claim 1 or 2,
wherein
for correcting the fine interpolator values a sum of the frequencies with which the individual fine interpolator values occur is formed and
corrected fine interpolators are obtained, in that the sum is divided by a constant.

7. Method according to claim 1 or 2,
wherein
in all four fine interpolators are used.

8. Method according to claim 1 or 2,
wherein
for the determination of the digital raw value counting only starts as from a second edge of clock following a starting event.

9. Method according to claim 1 or 2,
wherein
the starting signal is derived from a control electronics of a light source of the sensor unit.

10. Method according to claim 1 or 2,
wherein
prior to starting up the actual measurement operation, tables are recorded for at least one of the compensation of the fine interpolators and the pulse compensation.

11. Method according to claim 1 or 2,
wherein
during the measurement operation a table for the compensation of the fine interpolators is continuously tracked.

12. Method according to claim 1 or 2,
wherein
moving averaging is performed for the measured values.

13. Method according to claim 6,
wherein
the division by the constant takes place by rejecting a given number of least significant bits.

14. Apparatus for the optoelectronic contactless range measurement according to the transit time principle,
having a sensor unit with at least one light source for emitting light pulses and a detector for detecting light pulses, it being possible to determine a distance of an object from the sensor unit from a time difference between a starting signal and an echo signal derived from an optical measurement pulse reflected by the object,
and having a time measuring device for determining the time difference, said time measuring device having the following components:
a digital clock for determining a digital raw value from the starting signal and echo signal,
at least two fine interpolators for determining an initial time difference between starting signal and the beginning of the digital raw value and a final time difference between echo signal and the end of the digital raw value by converting an analog signals corresponding to the initial time difference or final time difference, respectively, into a digital initial time difference or digital final time difference, respectively, wherein for the automatic calibration of the fine interpolators a computing unit is provided which, on the basis of a plurality of measurements of the time difference between a starting signal and an echo signal derived from an optical measurement pulse reflected by the object, performs a statistical evaluation, the time intervals to be measured having no phase correlation with the digital clock and where the computing unit, assuming an equal distribution for the probability with which the values are measured in a given value interval for the initial time difference and final time difference, calculates corrections for at least one of nonlinearities and drifts of the fine interpolators.

15. Apparatus for optoelectronic contactless range measurement according to the transit time principle, having a sensor unit with at least one light source for emitting light pulses and a detector for detecting light pulses, it being possible to determine a distance of an object from the sensor unit from a time difference between a starting signal and an echo signal derived from an optical measurement pulse reflected by the object, and having a time measuring device for determining the time difference, said time measuring device having the following components:

a digital clock for determining a digital raw value from the starting signal and echo signal, at least two fine interpolators for determining an initial time difference between starting signal and the beginning of the digital raw value and a final time difference between echo signal and the end of the digital raw value by converting analog signals corresponding to the initial time difference or final time difference, respectively, into a digital initial time difference or digital final time difference, respectively, wherein a device is provided for dividing up the light pulses in each case into a measurement pulse and a reference pulse, a measurement optics is provided for conducting measurement pulses to the object and for conducting the measurement pulses reflected by object in the form of echo pulses onto the detector, a reference optics is provided for conducting the reference pulses in the direction of the detector, where an optical path of the reference pulses being longer or shorter by at least one offset distance compared with an optical path of the measurement pulses and the detector is used for the alternating quantitative detection of both the echo pulses and reference pulses, for the automatic calibration of the fine interpolators a computing unit is provided which, on the basis of a plurality of measurements of the time difference between a starting signal and a reference signal derived from the optical measurement pulse reflected by the object, carries out a statistical evaluation, where the time intervals to be measured having no phase correlation with the digital clock and in which the computing unit, assuming an equal distribution for the probability with which the values are measured in a given value interval for the initial time difference and final time difference, calculates corrections for at least one of nonlinearities and drifts of the fine interpolators.

16. Apparatus according to claim 14 or 15, wherein a device is provided for dividing up the light pulses in each case into a measurement pulse and a reference pulse and, a measurement optics is provided for conducting the measurement pulses onto the object and for conducting the measurement pulses reflected by the object in the form of echo pulses onto the detector, a reference optics is provided for conducting the reference pulses in the direction of detector, an optical path of the reference pulses being longer or shorter by at least one offset distance than an optical path of the measurement pulses and the detector is used for alternating quantitative detection of both the echo pulses and reference pulses.

17. Apparatus according to claim 16, wherein the optical path of the echo pulses contains a controllable pulse attenuator for the targeted attenuation of the echo pulses, so that they are dimensionally comparable with the reference pulses.

18. Apparatus according to claim 14 or 15, wherein the fine interpolators in each case have a TAO and an ADC.

19. Apparatus according to claim 18, wherein the TAO is a RC-element.

20. Apparatus according to claim 14 or 15, wherein in all there are four interpolators.

* * * * *